United States Patent
Hughes et al.

[11] Patent Number: 5,959,275
[45] Date of Patent: Sep. 28, 1999

[54] SYSTEM AND METHOD FOR REGISTERING AND MAINTAINING FIELD EQUIPMENT INVENTORY BASED ON INDIVIDUALIZED EQUIPMENT AND LOCATION INFORMATION

[75] Inventors: Craig T. Hughes, Tyler; Darel R. Stokes, Arlington, both of Tex.

[73] Assignee: MCI Communications Corporation

[21] Appl. No.: 08/823,942

[22] Filed: Mar. 25, 1997

[51] Int. Cl.⁶ .............................. G06K 17/00; G06K 5/00
[52] U.S. Cl. .......................... 235/375; 235/379; 235/380; 235/381
[58] Field of Search ..................................... 235/375, 379, 235/380, 381, 382

[56] References Cited

U.S. PATENT DOCUMENTS

| | | | |
|---|---|---|---|
| 5,142,550 | 8/1992 | Times ........................................... | 375/1 |
| 5,285,383 | 2/1994 | Lindsey et al. .......................... | 364/408 |
| 5,299,116 | 3/1994 | Owens et al. ............................ | 235/385 |
| 5,434,775 | 7/1995 | Sims et al. ................................ | 364/403 |
| 5,465,291 | 11/1995 | Barrus et al. ............................ | 235/381 |
| 5,686,892 | 11/1997 | Smith ........................................ | 340/572 |
| 5,696,902 | 12/1997 | Leclercq et al. ......................... | 235/380 |
| 5,710,557 | 1/1998 | Schouette ................................. | 235/380 |
| 5,745,036 | 4/1998 | Clare ........................................ | 340/572 |

*Primary Examiner*—Thien Minh Le
*Assistant Examiner*—Daniel St. Cyr

[57] ABSTRACT

A system and method for registering and tracking network equipment at the circuit card level. A computer network server is coupled with an equipment database that contains location and identification data for telecommunication network assets. A hand-held client, comprising a display, keyboard, bar code scanner and printer is coupled, via a radio link, to the computer network server. The hand-held client is used to register network assets and to query the equipment database for information relating to network assets. Users visit remote sites and register network assets in real-time, while walking through the equipment bays. In one embodiment, bar codes are used to display part numbers and serial numbers on circuit cards. In addition, bar codes are used to identify circuit card locations in terms of predefined identification numbers for the site, equipment bay, rack, shelf and slot. In other embodiments, some or all of the preceding information is entered into the keyboard of the hand-held client. The user begins the registration process by entering a starting location into the hand-held client. Next, beginning at the starting point, each circuit card is registered by scanning the part and/or serial number(s) into the hand-held client. After such numbers are entered, the equipment database is updated in real time with the new information. After data for one slot position is entered, the display screen on the hand-held client is automatically updated with location information for the next slot position, so that the registration process can continue in a step-by-step fashion.

29 Claims, 6 Drawing Sheets

SYSTEM AND METHOD FOR REGISTERING AND MAINTAINING FIELD EQUIPMENT INVENTORY BASED ON INDIVIDUALIZED EQUIPMENT AND LOCATION INFORMATION

CROSS-REFERENCE TO OTHER APPLICATIONS

The following applications of common assignee contain some common disclosure as the present application:

U.S. Patent Application entitled "System and Method for Maintaining and Viewing Configuration and Placement of Equipment in Field Sites", filed concurrently herewith, Ser. No. 08/823,557.

The above-listed application is incorporated herein by reference in their entireties.

BACKGROUND OF THE INVENTION

1. Field of the Invention

The present invention relates generally to telecommunication equipment tracking, and more specifically to a system and method for registering and maintaining location and other data for telecommunication field equipment at the circuit card level.

2. Related Art

A long distance telecommunications service provider (hereinafter "service provider"), typically maintains billions of dollars worth of network assets. The majority of such network assets are typically installed in numerous field sites throughout a vast geographical area that encompasses a long distance telephone network. For example, MCI maintains billions of dollars worth of network equipment located throughout North America in various field sites.

Generally, once network assets are shipped from distribution centers to the field, the service provider loses a degree of control and visibility over the assets. This is particularly true for network assets at the card level. Typically, network assets can be broken down into a plurality of circuit cards. For much of the network equipment, such circuit cards are typically mounted in generic-type equipment bays. Such equipment bays are typically organized as a plurality of side-by-side racks, each having a plurality of top-to-bottom shelves, wherein each shelf contains a plurality of vertically mounted slots. Circuit cards are installed in the vertically mounted slots.

Each circuit card is generally identified by a unique serial number. In addition, each slot can be identified by specifying a unique location hierarchy. For example a particular slot can be distinguished by specifying predetermined identifiers that represent the particular site, floor, row, equipment bay, rack, shelf and slot. Thus, individual cards can be completely identified by their serial number and their slot location hierarchy. Individual circuit card identification is necessary so that engineering changes, software updates, and other maintenance procedures can be performed at the card level.

However, the problem is that once a field site receives a piece of network equipment, the service provider looses visibility of individual circuit cards. It is common practice that such circuit cards are moved around within the remote site. For example, circuit cards that break down are taken out of service and replaced by spare circuit cards. In addition, circuit cards from one equipment bay may be placed in other equipment bays as needs arise. Thus, many difficulties occur when particular circuit cards need to be retrieved by the service provider.

For example, field modification bulletins are sent by equipment manufactures to notify customers about defective equipment. The manufacturer typically provides corrective measures designed to repair the defect. For example, replacement chips or replacement circuit cards may be provided. Thus, the service provider must be able to locate all of the circuit cards within the network that are subject to the defect noted in the field modification bulletin.

However, because of the low visibility of the network assets at the circuit card level, this can be a very difficult task. Service providers typically respond to field bulletins by sending out hundreds of notices, via courier, E-Mail and the like, to telecommunication personnel nationwide. The personnel are typically asked to report the numbers and locations of affected circuit cards within their jurisdiction. In order to comply with such requests, service personnel are typically dispatched into the field for manual inspections. Generally, this involves sending hundreds of personal to various field sites to search for the affected circuit cards. The searches are performed manually by inspecting each slot location in equipment bays where such cards are expected to be located. This can be an extremely expensive and time consuming process.

Another problem that occurs due to low visibility of network assets at the card level, is that service providers have no way of knowing which circuit cards are in-service and which circuit cards are being used as spares. Network assets that are being used as spares, need not be depreciated for tax purposes until they are put into service. However, since the service provider does not typically maintain this level of visibility, all network assets are generally depreciated as soon as they are sent into the field. Consequently, using the conventional method, tax records do not accurately reflect the actual use of telecommunication assets.

In addition, many circuit cards are warranted against defects. However, without a proper tracking mechanism in place, it is difficult or impossible to claim warranty rights when necessary. For example, suppose a circuit card has a five year warranty. Without proper tracking, a service provider can not determine which cards are under warranty and which cards are not.

What is needed therefore, is an efficient system and method for tracking network assets at the card level.

SUMMARY OF THE INVENTION

Accordingly, the present invention provides a means for registering and tracking network equipment at the card level. A computer network server is coupled with an equipment database that contains the identification, status and location of telecommunication network assets. A hand-held client, comprising a display, keyboard, bar code scanner and printer is coupled, via a radio link, to the computer network server.

The hand-held client is used to register network assets. In addition, the hand-held client is used to query the equipment database for information relating to network assets. A desktop client can also be used with the present invention. One advantage of using a hand-held unit to implement an embodiment of the present invention, is that such units are very convenient to use in the field. Users can visit remote sites and register network assets in real-time, while walking through the equipment bays. In one embodiment, bar codes are used to display part numbers and serial numbers on circuit cards. In addition, bar codes are used to identify circuit card locations in terms of predefined identification numbers for the site, equipment bay, rack, shelf and slot. In other embodiments, some or all of the preceding information is entered into the keyboard of the hand-held client. Accordingly, service provider personnel (hereinafter "user(s)"), can register network assets by walking through remote sites and entering data collected from equipment bays into the hand-held client.

The hand-held clients are driven by specialized software that resides within the the hand-held client and the remote network server. The software provides users with menu-driven screen prompts that takes them through a registration process in a step-by-step fashion. The user begins the registration process by entering a starting location into the hand-held client. For example the user specifies a particular site, floor, row, bay, shelf and slot. This information can be specified by entering the information into the keyboard or by scanning bar codes that represent each location. Next, beginning at the starting point specified by the user, each circuit card is registered by scanning the part and/or serial number(s) into the hand-held client, After such numbers are entered, the equipment database is updated in real time with the new information. Additional information, such as a description, the revision level and the like can be entered for each circuit card. Typically, users enter data in sequence according to slot positions. After data for one slot position is entered, the display screen on the hand-held client is automatically updated with location information for the next slot position. However, the user can alter the location information at any time by editing the location information that is presented on the screen of the hand-held client.

An additional feature of the present invention is that the user can access the equipment database to determine information related to assets that have already been registered. For example, a user can query the equipment database to determine what type of circuit card is registered for a particular slot. In this fashion, users can determine information about cards that are currently in service. For example, if a service provider specific part number (SPN), is not indicated on a circuit card, a user can query the equipment database with the manufactures part number (MPN). This will cause the equipment database to send back information to the hand-held client that will enable it to print out a bar code that reflects the SPN for immediate placement on the circuit card. In one embodiment, bar codes representing location data can be printed for immediate placement in the field.

An additional feature of the present invention is that it can be used during shipping and receiving network equipment. In one embodiment, the hand-held client is used to generate the appropriate shipping documents and database records needed to transfer equipment from one site to another. Upon receipt of such shipped items, a user at the receiving end of the shipment, uses the hand-held client to indicate receipt by scanning barcodes associated with the received equipment.

Yet another feature of the present invention is that it can be used in the field to swap replacement cards from equipment bays with cards from the spares inventory. Further, in one embodiment, a means is provided to effortlessly record the movement of circuit cards from one slot to another within a remote site. Still further, in a preferred embodiment, the present invention provides a means to copy the configuration of an entire equipment bay to facilitate the registration process under certain circumstances.

Further, the present invention can be used in combination with a system for viewing the configuration and placement of equipment at remote field sites. Specifically, the present invention can be used as a means to input data into such a system. An example of such a system can be found in the above referenced U.S. Patent application entitled "System and Method for Recording, Maintaining and Viewing Configuration and Placement of Equipment in Field Sites".

BRIEF DESCRIPTION OF THE FIGURES

The present invention will be described with reference to the accompanying figures, wherein.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Figure 1:
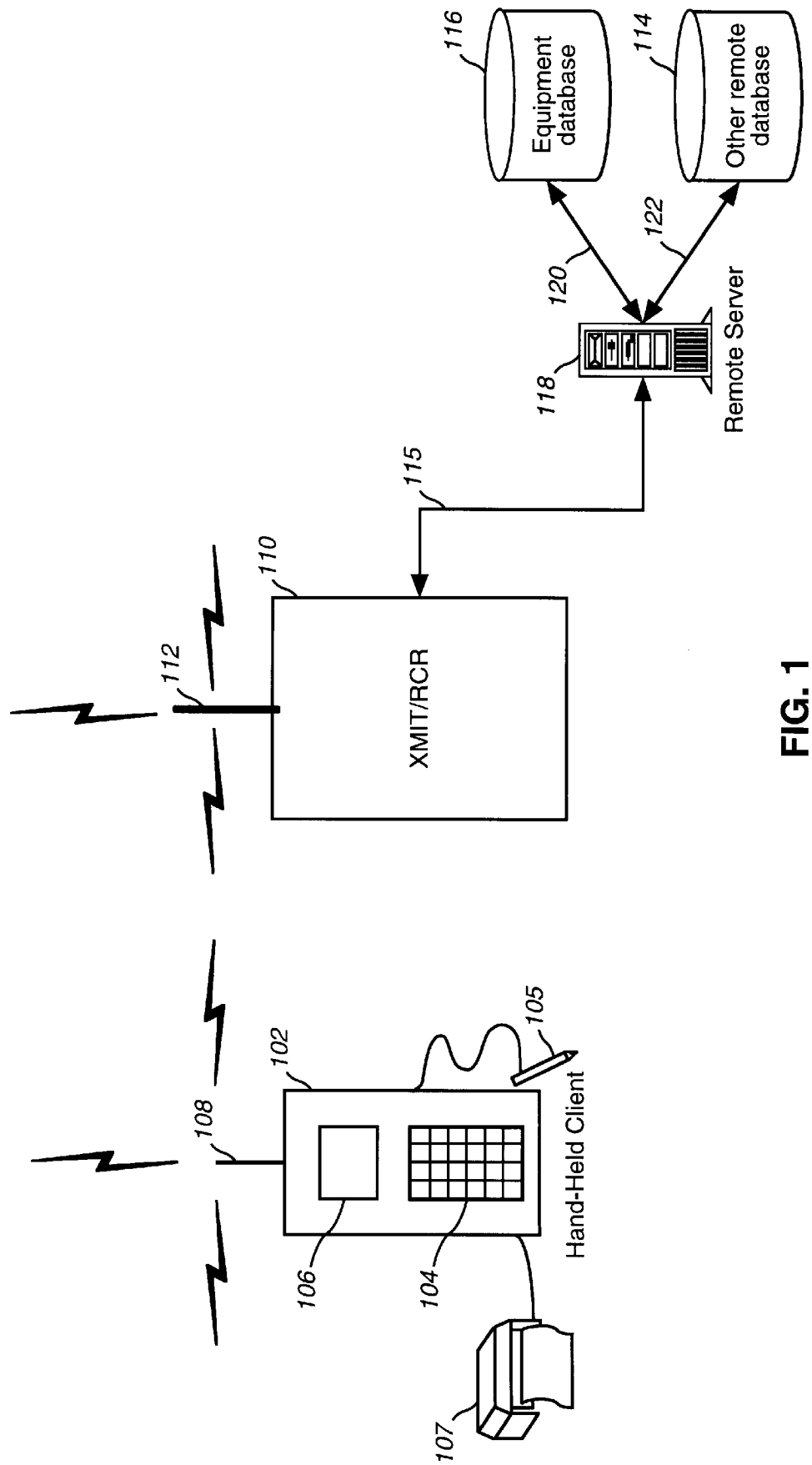
FIG. 1 is a block diagram depicting an operational environment of the present invention.

FIG. 1 is a block diagram depicting an operational environment of the present invention. A hand-held client 102 is coupled with a portable printing unit 107. The hand-held client 102 comprises a bar-code scanning unit 105, a display screen 106, a keyboard 104 and an antenna 108. The hand-held client 102 also includes a wireless transmitter/receiver (not shown). In one embodiment, the hand-held client 102 is a Spread Spectrum Band Multi-Purpose Terminal manufactured by Epic Data, Inc.

The hand-held client 102 is coupled with a transmitter/receiver unit 110, via wireless transmission links, such as spread spectrum radio frequency links. Other types of wireless links, such as microwave or satellite links can be used without departing from the scope and breadth of the present invention. The transmitter/receiver unit 110 is coupled with a remote server 118 via a bidirectional transmission line 116. One or more remote databases, such as the remote databases 114 and the equipment database 116, are coupled with the remote server 118, via bidirectional transmission lines 122 and 120, respectively.

Figure 2:
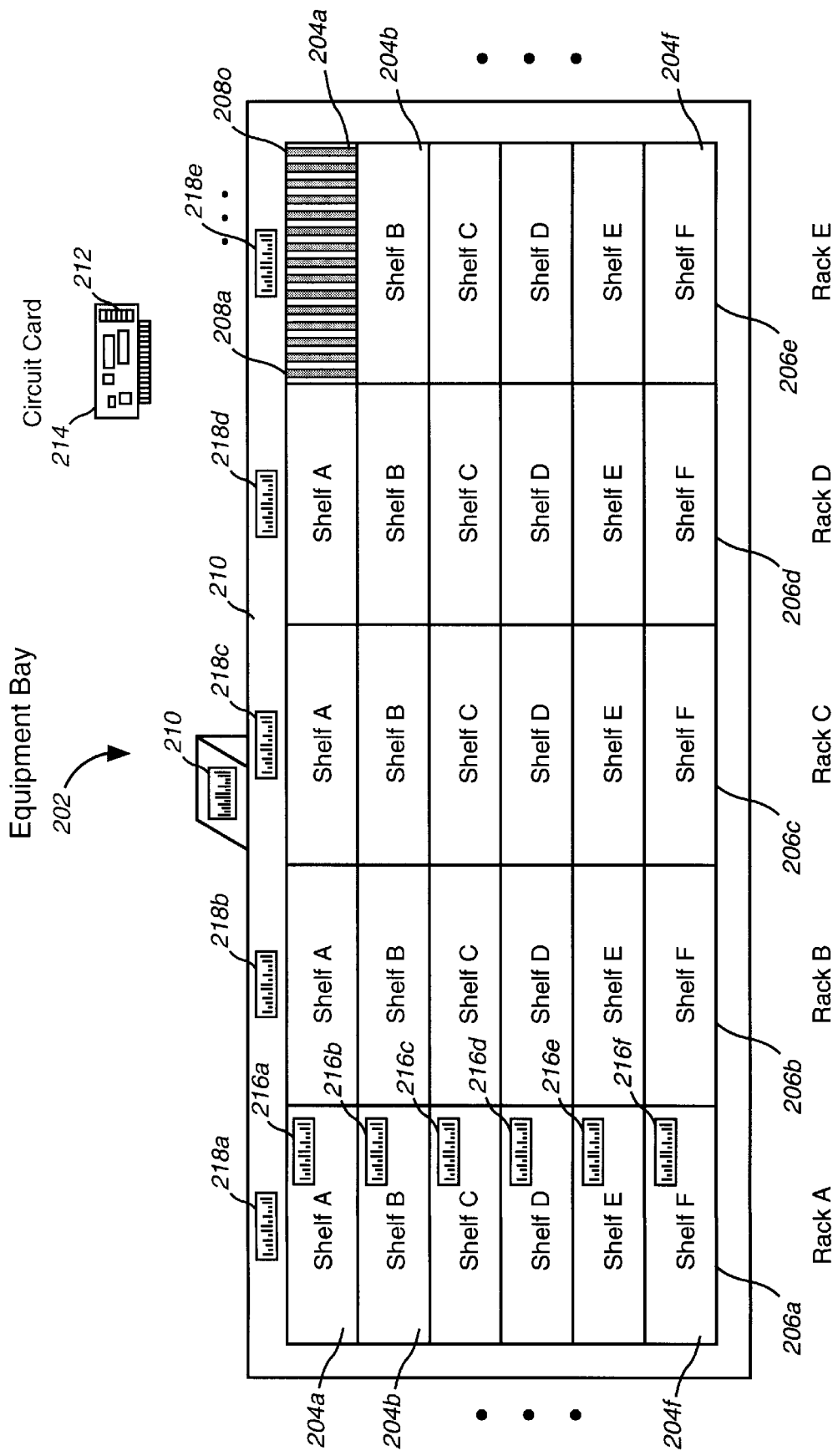
FIG. 2 is a block diagram of an equipment bay that is useful for describing the field registration process of the present invention.

FIG. 2 is a block diagram of an equipment bay that is useful for describing the field registration process of the present invention. As stated, network assets are typically classified down to the circuit card level. For much of the network equipment, such circuit cards are mounted in equipment bays that are organized as a plurality of side-by-side racks, each having a plurality of top-to-bottom shelves, each shelf containing a plurality of vertically positioned slots. Circuit cards are installed in the vertically positioned slots. An example of a typical equipment bay is the equipment bay 202 shown in FIG. 2.

The equipment bay 202 comprises a plurality of side-by-side racks. In this example, the equipment bay 202 has 5 racks 206a–206e (generally 206). Each rack 206 comprises a plurality of shelves. In this example, each rack 206 has 6 shelves 204a–204f (generally 204). Further, each shelf 204 comprises a plurality of vertically positioned slots. For simplicity, only the slots within the rack 206e, shelf 204a (upper right corner of the equipment bay 202) is depicted. In this example, each shelf 204 comprises 15 slots 208a–208o (generally 208). Circuit cards, such as the circuit card 214, are installed in the vertical slots 208.

Figure 3:
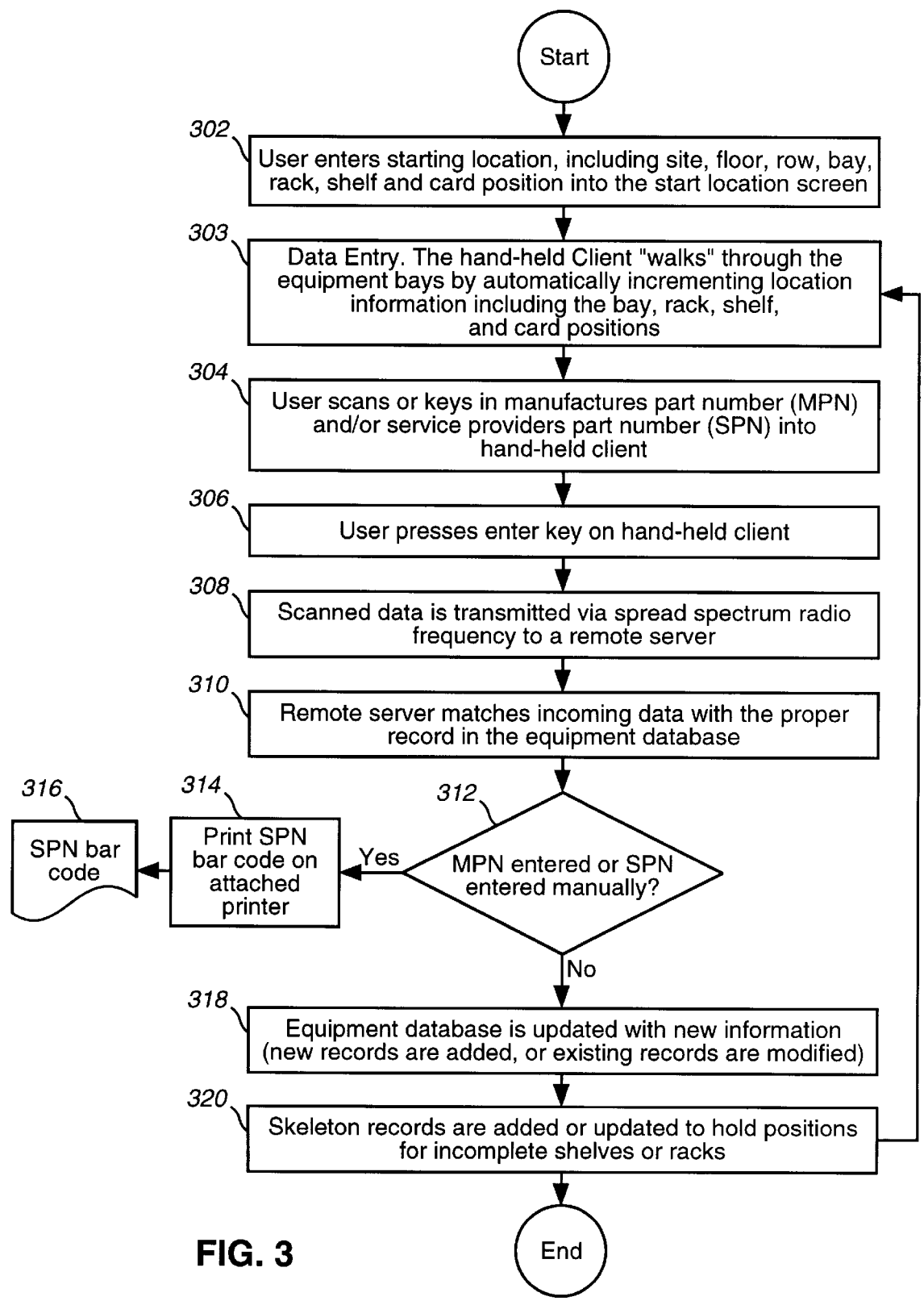
FIG. 3 is a flowchart that depicts a process that can be used to register network assets according to a preferred embodiment of the present invention.

FIG. 3 is a flowchart that depicts a process that can be used to register network assets according to a preferred embodiment of the present invention. The registration process begins with step 302. In step 302, the hand-held client 102 displays a start location screen on the display 106. An example of a start location screen is described below with reference to FIG. 5. In step 302, the user enters location information that identifies the starting position of the registration process. Typically the location information includes predefined reference numbers that uniquely identify the remote site, the floor within the remote site, and the row in which the first bay is located. In addition, the location information includes the bay, rack, shelf and slot identifiers as previously described. The user enters the preceding information by manually typing in the data via the keyboard 104 or by scanning-in bar codes which represent the appropriate location data, via the scanning device 105.

Note that it is contemplated that bar codes are used wherever possible to increase the efficiency of the registration process. Referring back to FIG. 2, in a preferred embodiment, a single unique bar code 210 is installed on the equipment bay 202 to uniquely identify the equipment bay within the particular remote site. Likewise unique bar codes 218a–218e are installed on each rack 206a–206e. Similarly, unique bar codes 216a–216f are installed on each shelf 204a–204f within each rack 206a–206e. Note that for simplicity, only the shelves 204a–204f in the rack 206a are depicted with bar codes. Finally, unique bar codes 212 representing part numbers and/or serial numbers are installed on each circuit card 214.

Referring back to FIG. 3, after the initial location information has been entered into the hand-held client 102 in step 302, control passes to step 303. In step 303, the hand-held client displays the data entry screen. An example of a data entry screen that can be used to implement and embodiment of the present invention is described below with reference to FIG. 6. Note that the hand-held client 102 is preferably programmed to "walk" through the equipment bays in order to assist the user with the registration process. That is, the hand-held client is preferably programmed to automatically alter location information on behalf of the user during the registration process to increase the efficiency of the process. This feature of the present invention can be implemented using a variety of methods. Generally, the walk through feature anticipates the next location to be registered and automatically provides the appropriate location information on the display screen 106 of hand-held client 102. After reading the present disclosure, various methods that can be used to implement the walk through feature of the present invention will be apparent to those skilled in the relevant art(s).

In this example, the walk through feature functions as follows. The first time step 303 is performed, the location information displayed on the data entry screen is identical to that entered on the start location screen in step 302. However, the next time step 303 is performed (i.e. after registration of the first network asset), the location information will reflect the anticipated next location. For example, the location information will be altered such that the site, row, bay, rack and shelf identifiers remain the same, but the slot identifier is incremented by 1 location. Thus, if the user is registering network assets in sequential order, the user need not enter additional location information into the hand-held terminal 102.

In addition, the user can 'hot key' to the start location screen (step 302) at any time. From there, the user can alter the location information by changing one or more fields on the start location screen (See FIG. 5). This allows the user to skip locations and perform the registration process in any order. In addition, this allows the user to make adjustments to the next anticipated location provided by the hand-held client 102, as necessary. For example, when a user reaches the last slot 208 in a particular shelf 204, the start location screen is used to alter the location information so that it reflects the first slot 208 on the next shelf 204. As stated, this information can be entered via the keyboard 104 or the scanner 105.

In one embodiment, the hand-held client 102 receives information from the equipment database 116 so that the walk through accurately reflects the actual layout of the equipment bay 210. In this manner, manual adjustments will not typically be necessary. The hand-held client will automatically present sequential location information in a predetermined sequence. Thus, for example, when a user reaches the last slot 208 on a shelf 204, the display screen 106 will automatically be updated to reflect the location of the first slot 208 on the next shelf 204. Similarly, when a user reaches the last slot 208 on the last shelf 204 of a particular rack 206, the display screen will automatically be updated to reflect the first slot 208 on the first shelf 204 in the next rack 206. Likewise, if a bay 204 is completed, the display screen will automatically be updated to reflect the first slot location 208 in the next bay 202.

As stated, the next anticipated location feature can be implemented using a variety of methods. One factor that should be considered when determining the manner in which to implement this feature is the amount of floor plan and layout information available from the remote database 116. This will vary with each implementation of the present invention.

In one embodiment, additional layout information is provided by the remote database 116 only after a particular equipment bay 202 has been previously registered according to the principles described herein. In this manner, the layout and floor plan information that was collected during the first registration process is used to assist the user during subsequent registration processes. In addition, whenever a particular location has previously been registered, the registration information will be depicted on the display screen 106. This feature can be used to inform the user about what is expected in a particular slot, as well as alert the user to potential registration errors.

Figure 6:
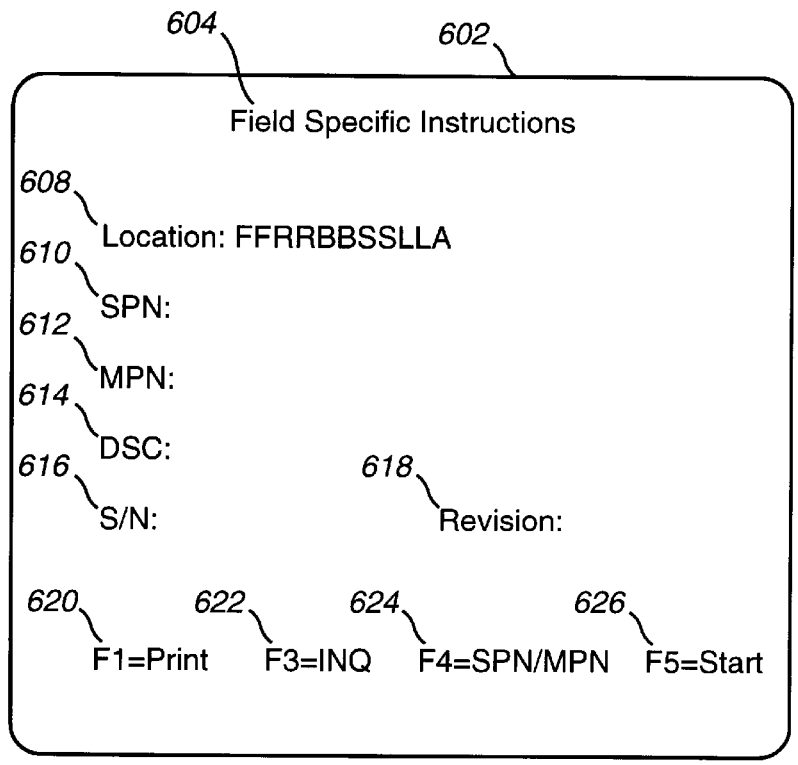
FIG. 6 is an example of a data entry screen according to a preferred embodiment of the present invention.

Next in step 304, the hand-held client displays a data entry screen. An example of such a data entry screen is depicted in FIG. 6 and subsequently described below. In step 304, the user scans or keys in the manufacture part number (MPN) or the service provider part number (SPN) into the hand-held client 102. In addition, the user can enter additional information such as a description, a serial number and a revision level. Note that is typically not necessary to register both the MPN and the SPN. The equipment database 116 is used to cross-reference such part numbers. Thus, if either the SPN or the MPN is supplied, the other part number is automatically supplied by the equipment database. This feature is further described below with reference to FIG. 6.

In this example embodiment, the MPN is the manufacturers part number and is used to order the component from the manufacturer. The SPN, is the service provider part number and is used internally by the service provider. SPNs are typically shared among similar network assets, such as circuit cards, that share the same form, fit, and function. Thus, a single SPN may be shared among assets having multiple MPNs. Thus, both MPNs and SPNs designate the type of part. The serial number, on the other hand, uniquely identifies individual components.

Note that the data fields such as MPN, SPN, etc. that are used in the example embodiment of the present invention are used for exemplary purposes only. Other data fields will be used in different implementations. Accordingly, the use of such data fields should not be construed to limit the scope and breadth of the present invention.

Next, in step 306, once the user has completed entering the data on the data entry screen, the enter key is depressed. In step 308, the data entered on the data entry screen is transmitted to the remote server 118. As stated, the hand-held client 102 is preferably linked to the remote server 118 via radio links, such as a spread spectrum radio frequency link. Thus, upon depressing the enter key in step 306, the data on the data entry screen is transmitted to the remote server 118 via the radio link. In step 310 the remote server 118 matches the incoming data with the proper record on the equipment database 116. The process continues with step 312.

In step 312, the process determines if either an MPN was entered (manually or scanned) or an SPN was entered manually rather than scanned. If either of these conditions are true, step 314 causes the printer 107 to print out an SPN bar code 316 for immediate placement on the circuit card 214. In this example, it is assumed that the service provider desires to display the SPN bar code on each circuit card 214 (in addition to a serial number bar code, which is a typical requirement). Thus, if the SPN was manually entered by the user in step 312, the process assumes that the SPN bar code is not present on the circuit card. Likewise, if a MPN was entered in step 312, it is assumed that the SPN bar code is not present on the circuit card 214. Thus, in both cases, the SPN bar code is printed out for immediate placement on the circuit card 214. In addition to this example, other bar codes can be requested by the user to be printed at any time, as described below. It should be noted that this is one example of a preferred embodiment of the present invention. In other embodiments, either the SPN the MPN or other bar codes can be printed, depending on the needs and desires of the service provider. As such, the use of the preceding examples, should not be construed to limit the scope and breadth of the present invention.

Continuing with step 318, the equipment database 116 is updated with the new network asset information as was entered in steps 302–304. If a record already exists for a particular slot 208, the record is updated with the new information. If a record does not exist, a new record is created. In addition, if one or more circuit card slots 208 are skipped, skeleton records are created to act as place holders for the skipped slots 208.

Figure 4:
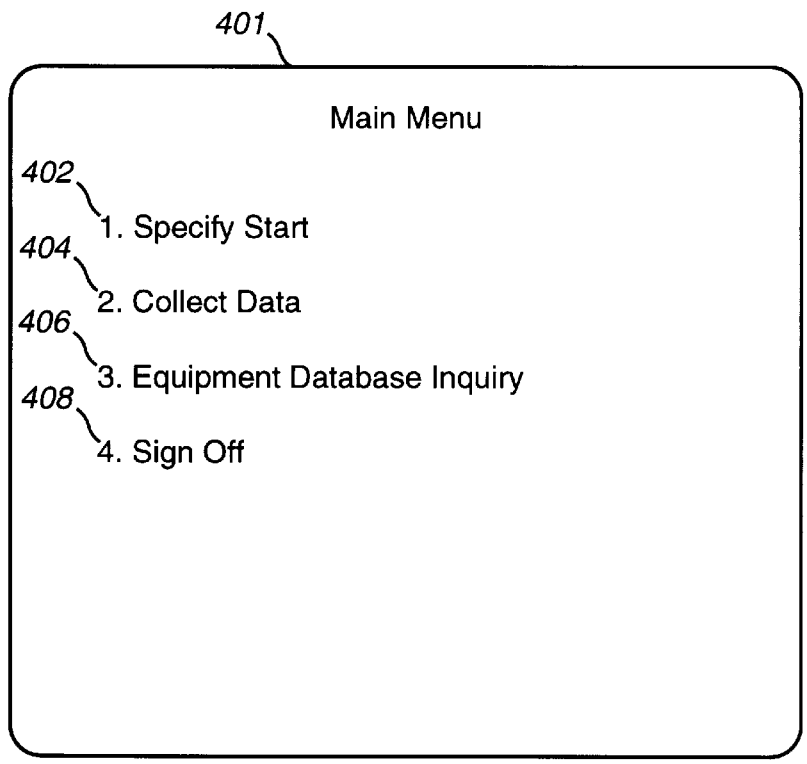
FIG. 4 is an example of a main menu screen according to a preferred embodiment of the present invention.

FIG. 4 is an example of a main menu screen that is displayed on the hand-held client 102, according to a preferred embodiment of the present invention. The main menu screen 401 comprises a number of menu items that can be selected by a user. In this example, the following menu items are provided: Specify Start 402, Collect Data 404, Equipment Database Inquiry 406, and Sign Off 408. Selecting the Specify Start 402 menu item, causes the start location screen to be displayed on the hand-held client 102. The start location screen is described below with reference to FIG. 5. Selecting the Collect Data 404 menu item causes the data entry screen to be displayed on the hand-held client 102. The data entry screen is described below with reference to FIG. 6. Selecting the Equipment Database Inquiry 406 menu item causes the equipment database inquiry screen to be displayed on the hand-held client 102. The equipment database inquiry screen is described below with reference to FIG. 7. Finally, selecting the Sign Off 406 menu item allows the user to sign off from the remote server 118.

Figure 5:
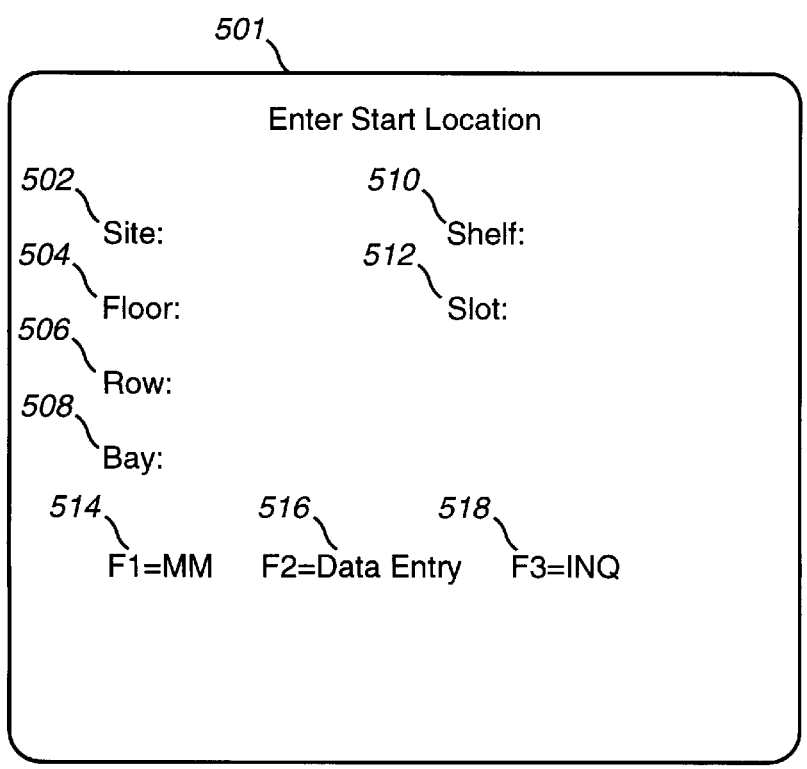
FIG. 5 is an example of a start location screen according to a preferred embodiment of the present invention.

FIG. 5 is an example of a start location screen that is displayed on the hand-held client 102, according to a preferred embodiment of the present invention. As stated, the start location screen can reached from the main menu 401. In addition, this screen can be reached from the data entry screen or the equipment database inquiry screen, as described below. The start location screen 501 comprises a number of fields that are used to identify the starting location of the network asset registration process, such as the one described with reference to FIG. 3. The start location screen 501 includes the following fields: Site 502, Floor 504, Row 506, Bay 508, Shelf 510, and Slot 512. Typically, a user inputs location information by highlighting a field, such as Bay 508. Once a field is highlighted, a user can input information pertaining to the highlighted field by using the keyboard 104 or the scanner 105, as previously described.

In addition, the user can hot key to the main menu by pressing F1 at any time, as indicated by the text 514 at the bottom of the start location screen 501. In addition, the user can hot key directly to the data entry screen (described below), by pressing F2, as indicated by the text 516. The user can also hot key directly to the equipment database inquiry screen (described below) by pressing F3, as indicated by the text 518. In one embodiment, if a user chooses to go to the database inquiry screen and then return directly to the start location screen 501, the location fields pertaining to the last network asset inquired about will be automatically transferred to the start location screen 501. Typically, once data is entered into the start location screen 501, the user presses F2 516 to hot key into the data entry screen.

FIG. 6 is an example of a data entry screen that is displayed on the hand-held client 102, according to a preferred embodiment of the present invention. This screen is used to collect data, and can be reached from the main menu 401, the start location screen 501, or the equipment database inquiry screen (described below). The data entry screen 602 comprises the following input fields: Location 608, SPN 610, MPN 612, Description 614, Serial Number 616 and revision 618.

In this example, the location field 608 contains location information in the following format: "FFRRBBSSLLA". This indicates character fields for the floor (FF), row (RR), bay (BB), shelf (SS), slot (LL) and A/B indicator (A). The A/B indicator in this example indicates whether the circuit card is a primary card ("A") or a daughter card ("B"). Note that in one implementation, the Location field 608 is a read only field. In this case, location data can be edited by returning to the start location screen 501, and entering data in each location field, as previously described. In another embodiment location information can be altered by directly editing the contents of the location field 608 via the keyboard 104.

The SPN field 610 contains the service providers part number as previously described. The MPN 612 field contains the manufacture part number as previously described. The DSC field 614 contains a description of the network asset. The serial number field 616 contains the serial number of the circuit card. Finally, the revision field 628 contains the revision number of the circuit card.

Field specific instructions 604 are provided for the user for the currently highlighted field. In addition, the user can press the F1 key as indicated by the text 620 to execute a print function. From there the user can print out bar code labels for any of the location or identification data previously described. As indicated by the text 622, the user can press the F4 key to have the equipment database 116 supply either the SPN or the MPN to the remote terminal 102. Accordingly, if the user enters the SPN and presses the F4 key, the MPN is automatically supplied. Likewise if the user enters the MPN and presses the F4 key, the SPN is automatically supplied. Finally, the user can press the F5 key as indicated by the text 628 to return to the start location screen 501.

Figure 7:
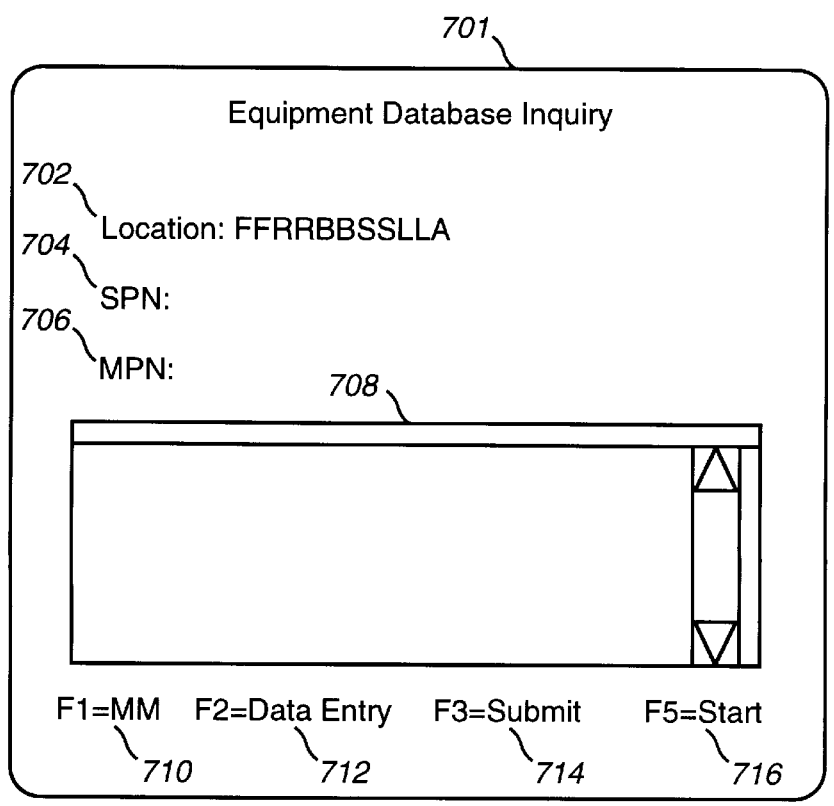
FIG. 7 is an example of an equipment database inquiry screen according to a preferred embodiment of the present invention.

FIG. 7 is an example of an Equipment Database Inquiry screen that is displayed on the hand-held client 102, according to a preferred embodiment of the present invention. This screen is used to display data from the equipment database 116 about a particular network asset. As stated, this screen can be reached from the main menu screen 401, the start location screen 501 or the data entry screen 602. In this example, the equipment database inquiry screen 701 comprises the following fields: location field 702, SPN field 704 and MPN field 706.

In this example, location information is displayed in the location field 702 in the same manner as previously described with reference to the data entry screen 602. Accordingly, this information is typically supplied by the user via the start location screen 501. Alternatively, a user can use the keyboard 104 to directly enter the location information into the location field 702. Once the location information is entered, the user submits the inquiry by pressing the F3 key, as indicated by the text 714. Once an inquiry has been submitted, the remote server 118 queries to the equipment database 116 and sends the results back to the hand-client 102. The hand-client then displays the results in the result window 708. In addition, the SPN 704 and the MPN 706 fields are filled-in, if such information is present in the equipment database 116.

In addition, the user can press the F1 key as indicated by the text 710 to go the main menu 401. As indicated by the text 712, the user can press the F2 key to return to the data entry screen 604. Finally, as indicated by the text 716, the user can press the F5 key to go to the start location screen 501.

Figure 8:
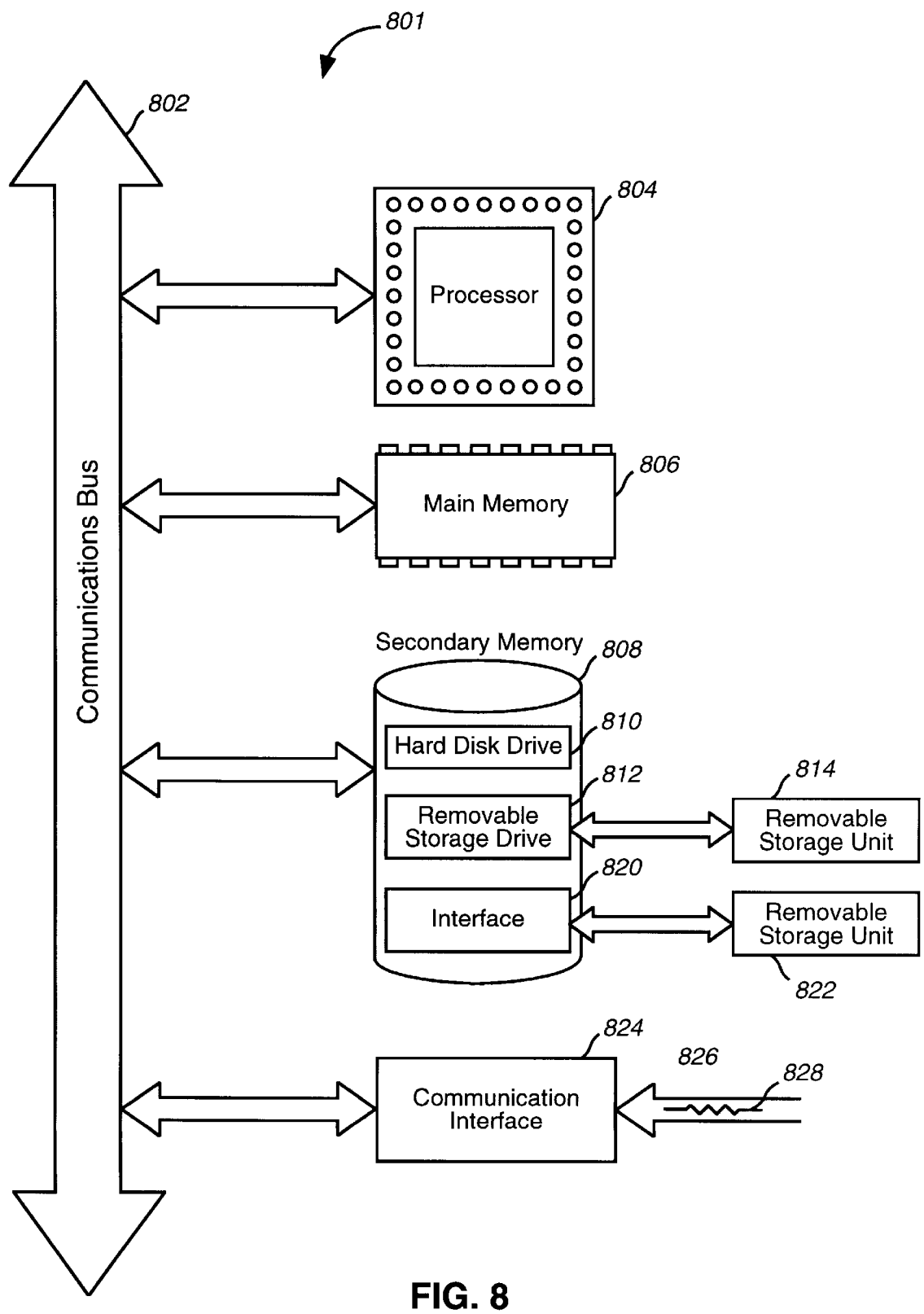
FIG. 8 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 801 is shown in FIG. 8. The computer system 801 includes one or more processors, such as processor 804. The processor 804 is connected to a communication bus 802. Various software embodiments are described in terms of this example computer system. After reading this description, it will become apparent to a person skilled in the relevant art how to implement the invention using other computer systems and/or computer architectures.

Computer system 802 also includes a main memory 806, preferably random access memory (RAM), and can also include a secondary memory 808. The secondary memory 808 can include, for example, a hard disk drive 810 and/or a removable storage drive 812, representing a floppy disk drive, a magnetic tape drive, an optical disk drive, etc. The removable storage drive 812 reads from and/or writes to a removable storage unit 814 in a well known manner. Removable storage unit 814, represents a floppy disk, magnetic tape, optical disk, etc. which is read by and written to by removable storage drive 812. As will be appreciated, the removable storage unit 814 includes a computer usable storage medium having stored therein computer software and/or data.

In alternative embodiments, secondary memory 808 may include other similar means for allowing computer programs or other instructions to be loaded into computer system 801. Such means can include, for example, a removable storage unit 822 and an interface 820. Examples of such can include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 801.

Computer system 801 can also include a communications interface 824. Communications interface 824 allows software and data to be transferred between computer system 801 and external devices. Examples of communications interface 824 can include a modem, a network interface (such as an Ethernet card), a communications port, a PCMCIA slot and card, etc. Software and data transferred via communications interface 824 are in the form of signals which can be electronic, electromagnetic, optical or other signals capable of being received by communications interface 824. These signals 826 are provided to communications interface via a channel 828. This channel 828 carries signals 826 and can be implemented using wire or cable, fiber optics, a phone line, a cellular phone link, an RF link and other communications channels.

In this document, the terms "computer program medium" and "computer usable medium" are used to generally refer to media such as removable storage device 812, a hard disk installed in hard disk drive 810, and signals 826. These computer program products are means for providing software to computer system 801.

Computer programs (also called computer control logic) are stored in main memory and/or secondary memory 808. Computer programs can also be received via communications interface 824. Such computer programs, when executed, enable the computer system 801 to perform the features of the present invention as discussed herein. In particular, the computer programs, when executed, enable the processor 804 to perform the features of the present invention. Accordingly, such computer programs represent controllers of the computer system 801.

In an embodiment where the invention is implemented using software, the software may be stored in a computer program product and loaded into computer system 801 using removable storage drive 812, hard drive 810 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for registering and tracking, in a remote equipment database, a plurality of network assets at the circuit card level, said network assets being installed in equipment bays located within field sites, said method comprising the steps of:

entering location data of a network asset into a hand-held client, that identifies a particular starting registration location of said network asset, wherein said hand-held client receives layout information of the equipment bay from the remote equipment database;

entering identification data of a network asset into said hand-held client, that identifies a particular network asset positioned at said starting registration location;

transmitting said location and identification data from said hand-held client to a remote server; and storing said location and identification data in the remote equipment database.

2. The method of claim 1, wherein said step of transmitting said location and identification data is accomplished via a wireless data communication means.

3. The method of claim 1, further, comprising the steps of:
anticipating a next registration location; and
displaying said next registration location on a display device.

4. The method of claim 1, further comprising the step of:
printing a representation of said identification data or said location data for immediate placement within said field sites.

5. The method of claim 1, further comprising the steps of:
querying said remote equipment database for equipment data related to one or more particular network assets; and
receiving from said remote equipment database said equipment data including said location and identification data related to said one or more particular network assets.

6. The method of claim 1, wherein said step of entering location data comprises the step of scanning a bar code, wherein said bar code represents said location data.

7. The method of claim 1, wherein said entering identification data step comprises scanning a bar code, wherein said bar code represents said identification data.

8. The method of claim 1, wherein said location data comprises a predefined location hierarchy.

9. The method of claim 8, wherein said predefined location hierarchy includes specifications for a site, row, bay, rack, shelf, and slot.

10. The method of claim 1, wherein said identification data comprises at least one from the group of: a serial number, a manufactures part number and an internal part number.

11. A computer program-product storage device readable by a computer system, tangibly embodying a computer program-product comprising instructions executable by the computer system to enable the computer system to perform method steps for registering and tracking a plurality of network assets at the circuit card level, said network assets being installed in equipment bays located within field sites, said method steps comprising the steps of:

receiving location data that uniquely identifies a particular starting registration location;

receiving network asset identification data that identifies a particular network asset positioned at said starting registration location;

transmitting said location data and identification data to a remote server via wireless data communication means, wherein said remote server sends layout information to the storage device comprising the layout of the equipment bay; and storing said location and identification data in a remote equipment database.

12. The computer-program product of claim 11, further comprising instructions executable by the computer system to enable the computer system to perform the steps of:
anticipating a next registration location; and
displaying said next registration location on a display device.

13. The computer-program product of claim 11, further comprising instructions executable by the computer system to enable the computer system to perform the step of:
printing a representation of said identification data or said location data for immediate placement within said field sites.

14. The computer-program product of claim 11, further comprising instructions executable by the computer system to enable the computer system to perform the step of:
querying said remote equipment database for equipment data related to one or more particular network assets; and
receiving from said remote equipment database said equipment data including said location and identification data related to said one or more particular network assets.

15. The computer-program product of claim 11, wherein said step of inputting location data further comprises instructions executable by the computer system to enable the computer system to perform the step of:
accepting said location data from a bar code scanning device, wherein said bar code scanning device is used to scan a bar code that represents said location data.

16. The computer-program product of claim 11, wherein said step of inputting identification data further comprises instructions executable by the computer system to enable the computer system to:
accepting said identification data from a bar code scanning device, wherein said bar code scanning device is used to scan a bar code that represents said identification data.

17. The computer-program product of claim 11, wherein said location data comprises a predefined location hierarchy.

18. The computer-program product of claim 17 wherein said predefined location hierarchy includes specifications for a site, row, bay, rack, shelf, and slot.

19. Computer-program product of claim 11, wherein said identification data comprises at least one from the group of: a serial number, a manufactures part number and an internal part number.

20. A system for registering and tracking a plurality of network assets at the circuit card level, said network assets being installed in equipment bays located within field sites, said system comprising:

an equipment database comprising identification and location data for network assets at a circuit card level;

a network server coupled with said database; and a hand-held client in data communications with said network server via a wireless data communications link, wherein said equipment database sends layout information to said hand-held client comprising the layout of the equipment bay and wherein said hand-held client is used within the field site for sending and receiving said location and identification data pertaining to said network assets between said hand-held client and said equipment database.

21. The system of claim 20, wherein said hand-held client further comprises a bar code scanner capable of scanning bar codes representing said location and identification data.

22. The system of claim 20, wherein said wireless data communication link is a spread spectrum radio link.

23. The system of claim 20, wherein said location data includes data pertaining to a site, row, bay, rack, shelf and slot.

24. The system of claim 20 wherein said identification data includes at least one from the group of: a serial number, a manufactures part number and an internal part number.

25. A system for registering and tracking a plurality of network assets at the circuit card level, said network assets being installed in equipment bays located within field sites, said system comprising:

a storage means for storing identification and location data for network assets at a circuit card level; and a portable registration means in data communications with said storage means, for sending said identification and location data to said storage means and further including:

a query means for requesting said identification and location data from said storage means, wherein said storage means transmits information to the portable registration means reflecting the actual layout of the equipment bay;

a display means for displaying said identification and location data; and a printing means for printing said location and identification data for immediate placement in said field sites.

26. The system of claim 25, wherein said registration means further comprises a scanning means for inputting said location and identification data by scanning symbolic representations of said location and identification data.

27. The system of claim 26, wherein said data communication means comprises wireless data communication link.

28. The system of claim 26, wherein said location data includes data pertaining to a site, row, bay, rack, shelf and slot.

29. The system of claim 26, wherein said identification data includes at least one from the group of: a serial number, a manufactures part number and an internal part number.

\* \* \* \* \*